United States Patent
Nammi et al.

(10) Patent No.: US 9,955,374 B2
(45) Date of Patent: *Apr. 24, 2018

(54) SYSTEMS AND METHODS FOR DETERMINING MEASUREMENT POWER OFFSETS

(71) Applicant: Telefonaktiebolaget L M Ericsson (publ), Stockholm (SE)

(72) Inventors: Sairamesh Nammi, Stockholm (SE); Muhammad Kazmi, Bromma (SE); Namir Lidian, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/040,011

(22) Filed: Feb. 10, 2016

(65) Prior Publication Data
US 2016/0157123 A1    Jun. 2, 2016

Related U.S. Application Data

(63) Continuation of application No. 14/113,863, filed as application No. PCT/SE2013/050950 on Aug. 5, 2013, now Pat. No. 9,264,201.

(Continued)

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0026* (2013.01); *H04L 1/06* (2013.01); *H04L 1/20* (2013.01);
(Continued)

(58) Field of Classification Search
CPC . H04W 52/16; H04W 52/325; H04W 52/146; H04W 24/10; H04W 52/228;
(Continued)

(56) References Cited

U.S. PATENT DOCUMENTS

2002/0061764 A1   5/2002  Kim et al. .............. 455/522
2007/0189230 A1*  8/2007  Lee ................... H04W 52/16
                                                      370/335
(Continued)

FOREIGN PATENT DOCUMENTS

CN   100553172 C    10/2009
EP     1351424 A2   10/2003
(Continued)

OTHER PUBLICATIONS

First Official Action dated Mar. 11, 2016 in corresponding Japanese application No. 2015-527424, 4 pages (English translation only).
(Continued)

*Primary Examiner* — Sai Ming Chan
(74) *Attorney, Agent, or Firm* — Rothwell, Figg, Ernst & Manbeck, P.C.

(57) ABSTRACT

Disclosed herein, among other things, is a method performed by a user equipment (UE) for providing to a network channel station information (CSI). The method comprises: receiving from the network two measurement power offsets, a first measurement power offset and a second measurement power offset; selecting one of said two measurement power offsets; computing CSI using the selected measurement power offset; and transmitting to the network the determined CSI.

14 Claims, 15 Drawing Sheets

Related U.S. Application Data

(60) Provisional application No. 61/683,584, filed on Aug. 15, 2012.

(51) Int. Cl.

| | | |
|---|---|---|
| *H04L 1/06* | (2006.01) | |
| *H04L 1/20* | (2006.01) | |
| *H04L 5/00* | (2006.01) | |
| *H04W 52/22* | (2009.01) | |
| *H04W 72/02* | (2009.01) | |
| *H04W 72/04* | (2009.01) | |

(52) U.S. Cl.
CPC ......... *H04L 5/0057* (2013.01); *H04W 52/228* (2013.01); *H04W 72/02* (2013.01); *H04W 72/0413* (2013.01)

(58) Field of Classification Search
CPC   H04W 72/02; H04W 72/0413; H04L 1/0026; H04L 1/06; H04L 1/20; H04L 5/0057
USPC ........................................................ 370/252
See application file for complete search history.

(56) References Cited

U.S. PATENT DOCUMENTS

| | | | |
|---|---|---|---|
| 2009/0093243 A1 | 4/2009 | Lee et al. | |
| 2012/0088458 A1 | 4/2012 | Nogami et al. | |
| 2012/0257524 A1* | 10/2012 | Chen ................. | H04W 24/10 370/252 |
| 2012/0287869 A1* | 11/2012 | Xi .................... | H04L 5/003 370/329 |
| 2013/0194940 A1* | 8/2013 | Li .................... | H04J 11/0023 370/252 |
| 2014/0086166 A1 | 3/2014 | Lindbom et al. .......... | 370/329 |

FOREIGN PATENT DOCUMENTS

| | | |
|---|---|---|
| JP | 2010-521827 A | 6/2010 |
| JP | 2011-4212 A | 1/2011 |
| WO | 2008/077524 A2 | 7/2008 |

OTHER PUBLICATIONS

Ericsson, "4-branch MIMO for HSDPA", 3GPP TSG RAN WG1 Meeting #65, R1-111763, Agenda Item 5.6, May 9-13, 2011, 17 pages.

Ericsson, et al., "Common Pilot Design for Four Branch MIMO System", 3GPP TSG RAN WG1 Meeting #68, R1-120352, Agenda Item 6.3.1, Feb. 6-10, 2012, 11 pages.

Ericsson, "New WI: Four Branch MIMO Transmission for HSDPA", 3GPP TSG-RAN Meeting #53, RP-111393, Agenda Item 13.1.2, Sep. 13-16, 2011, 16 pages.

International Search Report and Written Opinion issued in corresponding application PCT/SE2013/050950 dated Nov. 13, 2013, 13 pages.

Ericsson, "Remaining Issues in the Pilot Design Schemes in Four branch MIMO System", 3GPP TSG-RAN WG1 #70, Qingdao, R.R. of China, Aug. 13-17, 2012, R1-123754, Agenda Item 6.3.1, 8 pages.

Huawei, et al., "Clarification of the CQI definition when the UE is configured in MIMO mode", 3GPP TSG-RAN WG1 Meeting #62, Madrid, Spain Aug. 23-27, 2010, R1-105004, Change Request 25.214 CR 604, Rev 5, v. 9.2.0, 5 pages.

Nokia Siemens Networks, "On the performance of pilot design options", 3GPP TAG RAN WG1 Meeting #68bis, Jeju, Mar. 26-30, 2012, R1-121723, Agenda Item 6.3.1, 4 pages.

Renesas Mobile Europe Ltd., "Discussion on Piolet Design in Four Branch Downlink MIMO System", 3GPP TSG-RAN WG1 #70, Qingdao, R.R. of China, Aug. 13-17, 2012, R1-123764, Agenda Item 6.3.1, 4 pages.

International Preliminary Report on Patentability, from PCT/SE2013/050950, dated Nov. 26, 2014, 7 pages.

Ericsson, "Computation of Channel Quality Indicator with Demodulation Pilots in Four Branch MIMO System", 3GPP TSG-RAN WG1 #70, 2012, 2 pages.

Ericsson, "Scheduled Common Pilot Performance in a Four branch MIMO System," 3GPP TSG-RAN WG1 #69, R1-122808, Prague, Czech Republic, May 21-25, 2012, 7 pages.

Huawei, et al., "Remaining considerations on scheduled pilots for 4-branch MIMO," 3GPP TSG-RAN WG1 Meeting #70, R1-123815, Qingdao, China, Aug. 13-17, 2012, 7 pages.

Communication dated Nov. 7, 2016, issued in European application No. 13 750 971.7, 7 pages.

Japanese Office Action dated Nov. 18, 2016, issued in Japanese Application No. 2015-527424, with English Translation, 6 pages.

Chinese Office Action issued in Application No. 2013800431519 dated Sep. 18, 2017, 5 pages.

Chinese Search Report issued in Application No. 2013800431519 dated Sep. 4, 2017, 5 pages.

\* cited by examiner

US 9,955,374 B2

SYSTEMS AND METHODS FOR DETERMINING MEASUREMENT POWER OFFSETS

CROSS-REFERENCE TO RELATED APPLICATIONS

This application is a continuation of U.S. patent application Ser. No. 14/113,863, filed on Oct. 25, 2013 (published as U.S. Patent Pub. No. 20140328259), which is a 35 U.S.C. § 371 National Phase Entry Application from PCT/SE2013/050950, filed Aug. 5, 2013, which claims priority to U.S. provisional patent application No. 61/683,584, filed on Aug. 15, 2012. The above identified applications and publications are incorporated by reference.

TECHNICAL FIELD

Aspects of this disclosure relate to systems and methods for determining measurement power offsets in network that uses multiple pilots, such as, for example, a multi-antenna communication system.

BACKGROUND

Multiple input multiple output (MIMO) is an advanced antenna technique to improve the spectral efficiency and thereby boosting the overall system capacity. The MIMO technique uses a commonly known notation (M×N) to represent MIMO configuration in terms number of transmit (M) and receive antennas (N). The common MIMO configurations used or currently discussed for various technologies are: (2×1), (1×2), (2×2), (4×2), (8×2) and (8×4). The configurations represented by (2×1) and (1×2) are special cases of MIMO and they correspond to transmit diversity and receiver diversity respectively. The configuration (2×2) is used in WCDMA release 7 and configurations ((4×4), (4×2) (4×1)) are being defined in Third Generation Partnership Project (3GPP) release 11.

Currently a 4Tx transmissions scheme for High-Speed Downlink Packet Access (HSDPA) is discussed within 3GPP standardization. Previous versions of the specification supported up to 2 TX antenna transmissions. In order to support 4Tx MIMO transmissions, it is necessary to obtain 4 channel estimates in order to characterize each of the 4 spatial layers, which will require new pilot signals to be defined. Pilots are needed for two main functionalities; channel state information (CSI) estimation through channel sounding where rank, a channel quality indicator (CQI) (also referred to as channel quality information) and a precoding control index (PCI) are estimated and channel estimation for demodulation purposes.

For 4 branch MIMO, at least two different approaches are possible (1) Common pilots for both CSI and channel estimation for data demodulation and (2) Common pilots for CSI estimation and additional pilots for channel estimation for data demodulation.

In the above context, "common pilots" refer to pilots that are made available to all users and which are transmitted without user specific beamforming.

Common pilots may be transmitted at instances in which legacy users (Release 7 MIMO and Release 99), who are not able to demodulate 4TX transmissions are scheduled. These legacy users cannot make use of the energy in the common pilots. However, the energy in the additional common pilots will reduce the amount of energy available for High-Speed Physical Downlink Shared Channel (HS-PDSCH) scheduling to the legacy users. Moreover, the additional pilots cause interference to these users. Therefore, to minimize performance impacts to non 4TX users, it is essential that the power of the common pilots can be reduced to a low value.

In a High-Speed Downlink Packet Access (HSDPA) system, the user equipment (UE) (e.g., communication device) has to periodically report a channel quality indicator (CQI). The period is configured by the higher layers. For the purpose of channel quality reporting the UE has to know the powers of the pilots and the measurement offset (a.k.a., measurement power offset).

In Release 7 MIMO (2×2), for the purpose of CQI reporting, the UE shall assume a total transmit power of HS-PDSCH ($P_{HSPDSCH}$) is given by:

$$P_{HSPDSCH} = P_{CPICH} + \Gamma \text{ in dB,}$$

where the total transmit power is assumed to be evenly distributed among the HS-PDSCH codes corresponding to the reported CQI value, and the measurement power offset $\Gamma$ (i.e., an offset value) is signaled by higher layers. $P_{CPICH}$ denotes the combined transmit power of a set of CPICH(s) (e.g., a primary CPICH and three secondary CPICHs) used for MIMO operation of the High-Speed Downlink Shared Channel (HS-DSCH).

The base station (e.g., Node B) sends the measurement power offset information through higher order signalling for example Radio Resource Control (RRC) messages. The actual measurement power offset can vary from TTI to TTI since HS-PDSCH power depends upon power transmitted by Node B when user is scheduled. A user can be scheduled every TTI. To reduce overhead, the measurement power offset is signalled preferably only at the start of an HSDPA session. Therefore, the Node B re-computes the actual CQI based on the current or recent measurement power offset and the signalled measurement power offset. The Node B knows the signalled measurement power offset. In a four branch MIMO, it was decided to use two types of pilot solutions. The Node B informs the UE which one of the two to use. In each case, the measurement power offset computation is different. Hence a new method to determine the measurement power offset and convey this information is desired.

SUMMARY

Described herein are, among other embodiments, various embodiments for computing measurement power offset and conveying this information to UE. The various embodiment may be utilized in a mixed pilot scenario—e.g., the case of common pilots and scheduled or demodulation common pilots.

In one aspect, a method performed by a network node is provided. In some embodiments, the method includes: determining whether a first scheme (scheme-1) or a second scheme (scheme-2) should be used to calculate a measurement power offset (MPO). In some embodiments, this step consists of (or comprises) determining whether a determined signal quality value (SQV) is above a threshold (T). In other embodiments, the step consists of or comprises determining whether a UE recommended scheme-1 or scheme-2. In response to determining that scheme-1 should be selected (e.g., in response to determining that the SQV is above T), the network node uses scheme-1 to calculate the MPO. Otherwise, in response to determining that scheme-2 should be selected (e.g., in response to determining that the SQV is not above T), the node uses scheme-2 to calculate the MPO. The node then sends to the UE (directly or indirectly) a message containing the calculated MPO.

In another aspect, a network node is provided. In some embodiments, the network node comprises a data storage system and a data processing system. The data storage system comprises instructions executable by the data processing system whereby the network node is operative to: determine a first measurement power offset, Γ1, based on a first scheme, scheme-1; determine a second measurement power offset, Γ2, based on a second scheme, scheme-2; and inform the UE of Γ1 and Γ2.

In another aspect, a method performed by a first network node for sending to a UE two measurement power offsets: a first measurement power offset, Γ1, and a second measurement power offset, Γ2, is provided. In some embodiments, the method includes: receiving Γ1 and Γ2 from a calculating node that calculated Γ1 and Γ2, wherein the Γ1 and Γ2 are calculated based on a first scheme, scheme-1, and a second scheme, scheme-2, respectively; including Γ1 and Γ2 in a Radio Resource Control, RRC, message; and transmitting to the UE the RRC message.

In another aspect, a first network node for sending to a UE two measurement power offsets: a first measurement power offset, Γ1, and a second measurement power offset, Γ2, is provided. In some embodiments, the first network node is adapted to: receive Γ1 and Γ2 from a calculating node that calculated Γ1 and Γ2; include Γ1 and Γ2 in a Radio Resource Control, RRC, message; and transmit the RRC message towards the UE.

In another aspect, a method performed by a UE is provided. In some embodiments the method includes: the UE receives a first measurement power offset (MPO1) and a second measurement power offset (MPO2) from a network node. The UE then selects one of MPO1 and MPO2. In some embodiments, the selection is based on whether a determined SQV is above a threshold value (T), and in other embodiments the determination is based on a received HS-SCCH order. In response to selecting MPO1, the UE uses MPO1 for CSI estimation, but not MPO2 (e.g., uses MPO1 to determine one or more of CQI, PCI, and RI). Otherwise, in response to selecting MPO2, the UE uses MPO2 for CSI estimation, but not MPO1 (e.g., uses MPO2 to determine one or more of CQI, PCI, and RI). Next, the UE sends to the network the CSI (e.g., a CSI report identifying CQI, PCI). The UE may also send to the network a message comprising information (e.g., a sing bit of information) indicating which measurement power offset was selected (i.e., MPO1 or MPO2).

In another aspect, a UE is provided. In some embodiments, the UE comprises a data storage system and a data processing system, the data storage system storing instructions executable by the data processing system whereby the UE is operative to: receive from a network node two measurement power offsets, a first measurement power offset and a second measurement power offset; select one of said two measurement power offsets; use the selected measurement power offset for channel station information, CSI, estimation; and transmit the CSI.

An advantage of this disclosure is that the impact of 4 TX MIMO on legacy terminals arising from the need for additional pilots can be kept on a reasonable level. At the same time as high power pilots can be provided to the terminal as an aid for data detection.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 13:
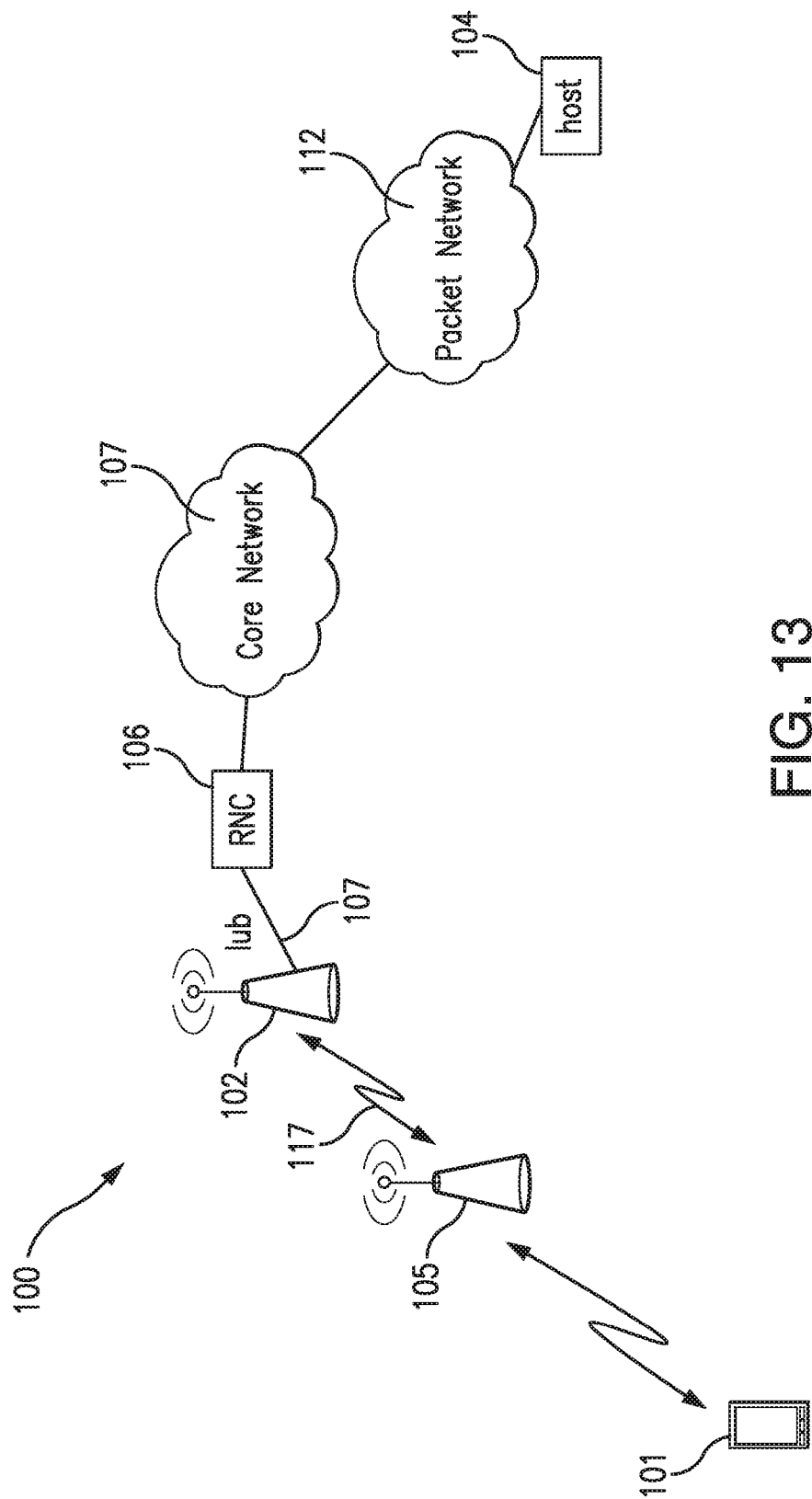
FIG. 13 illustrates an example communication system.

Referring to FIG. 13, FIG. 13 shows an example network 100 in which the methods described herein may be employed. Network 100 is a wireless communication system that enables a wireless communication device 100 (also referred to as user equipment (UE)) to communicate with, among other devices, a host 104 connected to a packet data network 112 (e.g., the Internet). In the example shown, network 100 includes a radio access network (RAN) that includes a relay node 105, a base station 102 (also referred to as Node B), a radio network controller (RNC) 106, and a core network 107.

I. Overview of Pilot Design Schemes for MIMO Systems

As mentioned above, at least two pilot design schemes are contemplated: 1) common pilots for CSI estimation and data demodulation and 2) common pilots for CSI estimation and additional pilots without precoding for data demodulation (scheduled pilots demodulation common pilots).

1. Common Pilots for CSI Estimation and Data Demodulation

Figure 1:
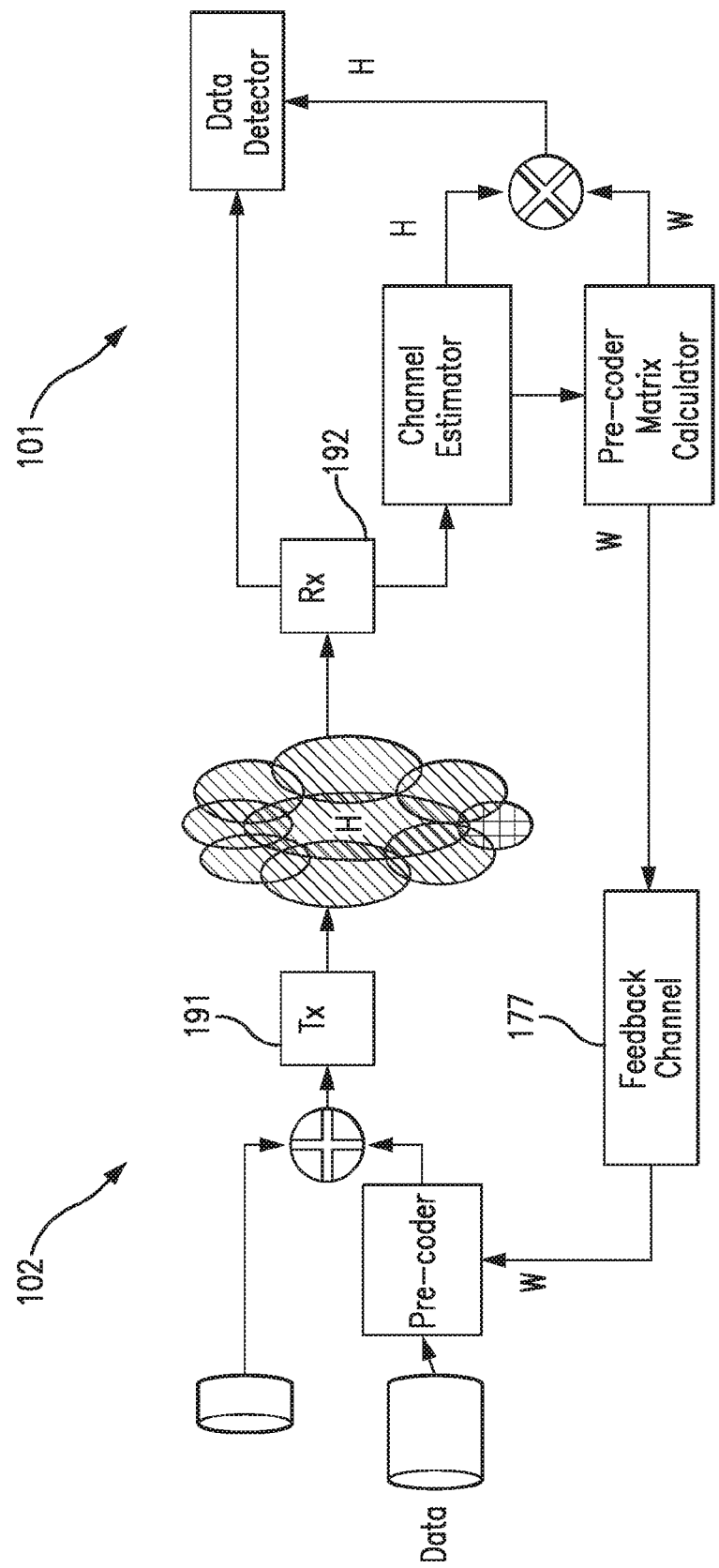
FIG. 1 is a diagram of a common pilot design system.

FIG. 1 is diagram of a common pilot design system. At the Node B 102 transmitter 191, known pilot symbols are transmitted for channel sounding. The UE 101 receiver 192 receives the pilot symbols and the UE determines channel quality (typically SINR) from channel sounding, and computes a preferred precoding matrix and CQI for the next downlink transmission. This information is conveyed to the Node B through a feedback channel 177. The Node B processes this information and determines the precoding matrix and modulation and some other parameters (e.g., transport block size, etc.) and conveys this information to the UE through a downlink control channel. Data is transmitted with the modulation and coding rate indicated in the downlink control channel. The data is pre-multiplied by precoding vector/matrix before passing to the antenna ports. For data demodulation, the UE receiver 192 estimates the channel for data demodulation from the common pilot symbols.

Figure 2:
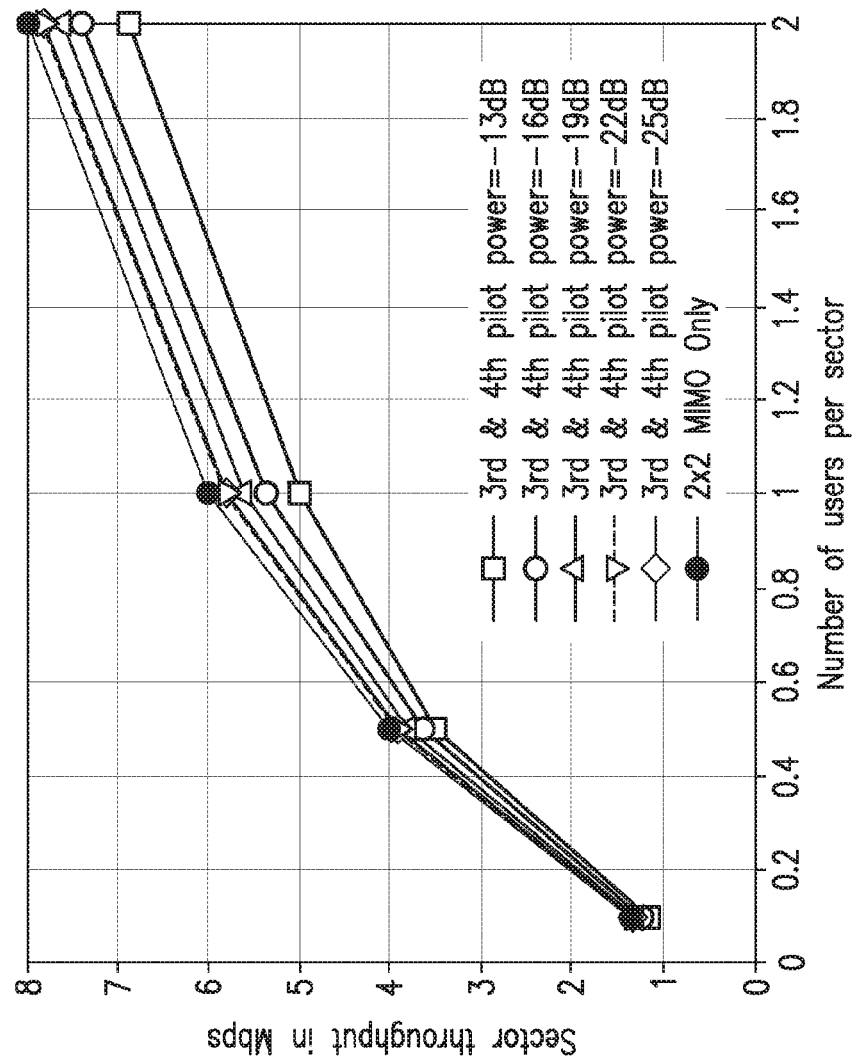
FIG. 2 shows the performance of a pilot reduction scheme.

Common pilot only solutions will have a negative impact on legacy users unless the power on the additional pilots is minimal. FIG. 2 shows the performance of a pilot reduction scheme on the sector throughput with different number of users per sector. For this simulation, it is assumed that all the users are Release-7 MIMO capable with 2 receive antennas. The additional interference due to third and fourth pilots is considered with different power levels. The pilot powers for the first and the second antennas are set to −10 dB and −13 dB respectively. As indicated, as the power of the additional pilots is decreased, the impact on the system throughput performance is less. For example, if the pilot power is around −19 dB, then the impact on the legacy users is almost negligible.

Figure 3:
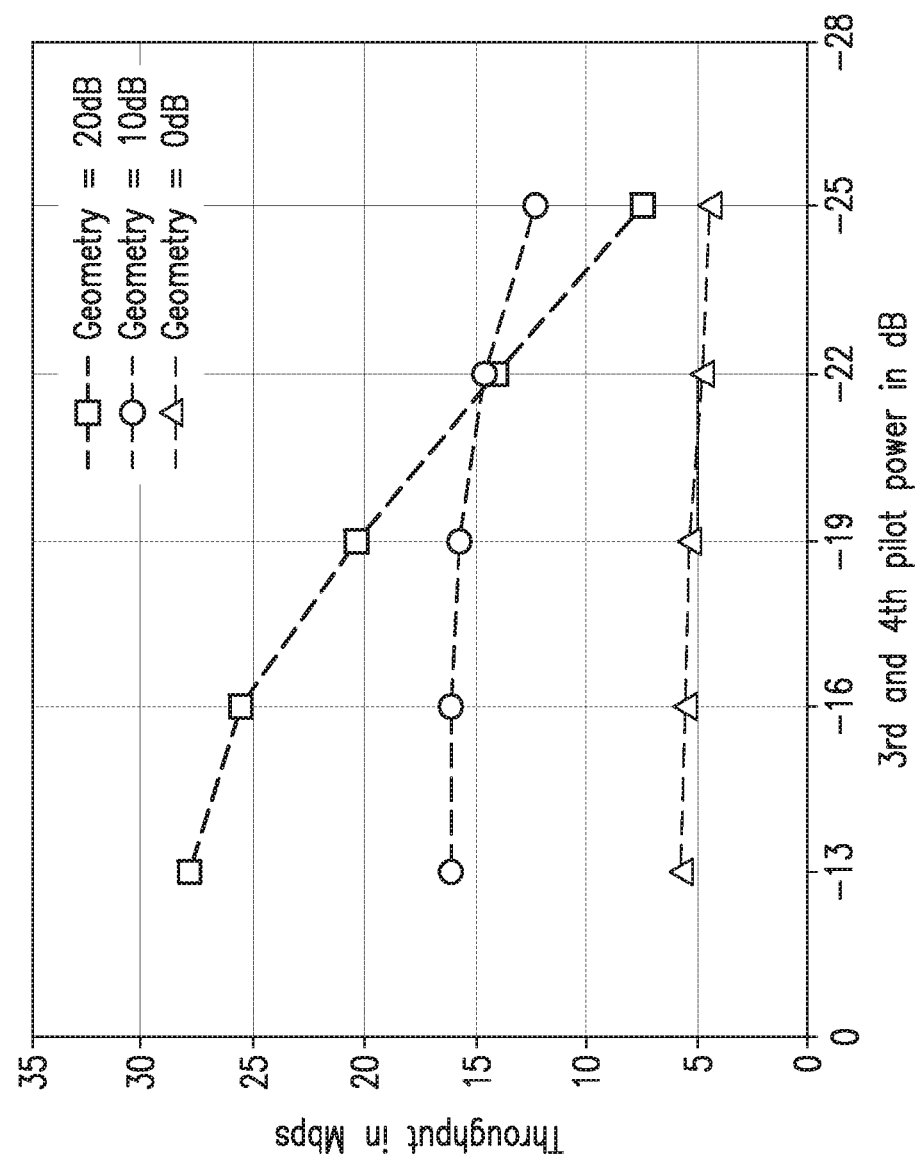
FIGS. 3 and 4 show the Link level throughput for a UE with 3 different C/I for 4×4 MIMO and 4×2 MIMO.
Figure 4:
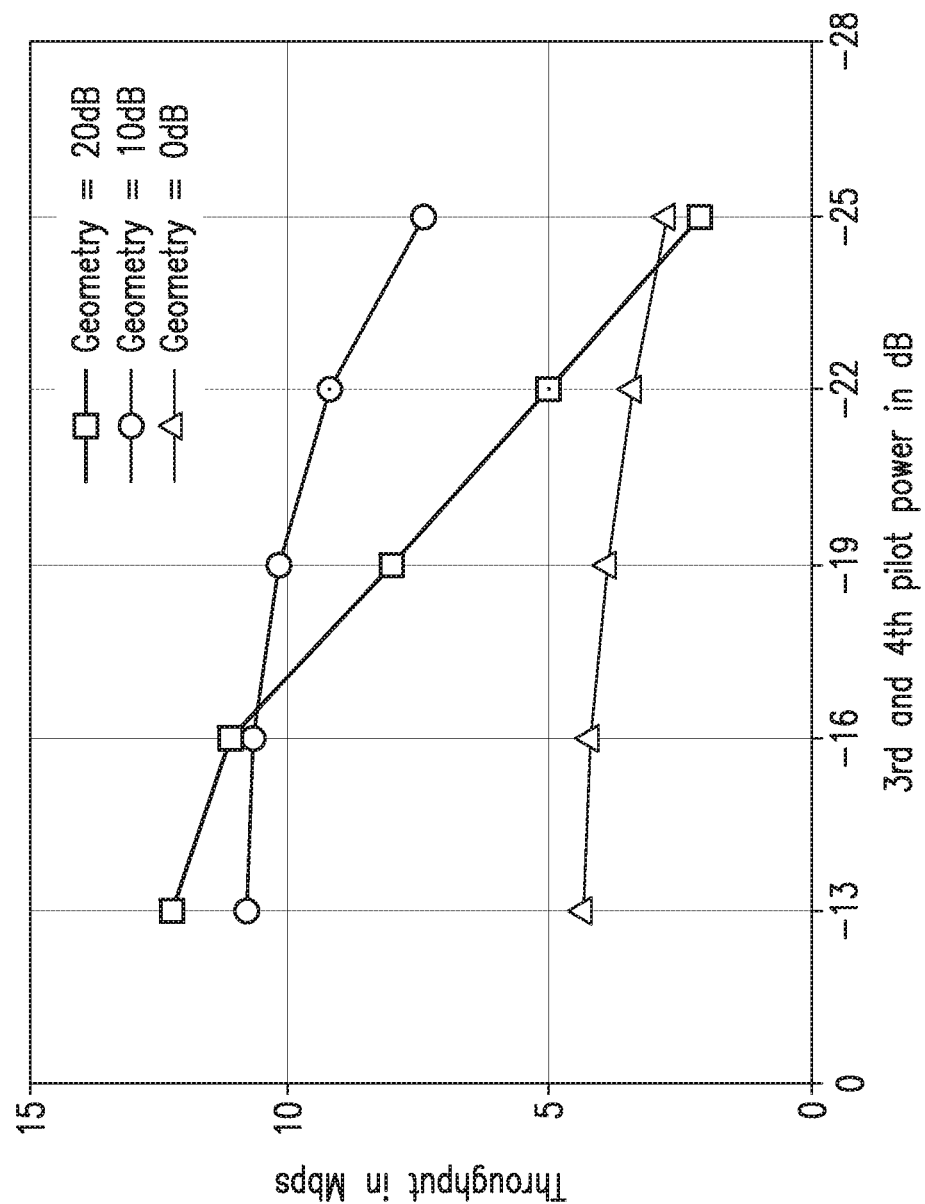

However, if the power is minimal, then the demodulation performance of 4TX users will be adversely impacted. FIGS. 3 and 4 show the Link level throughput for a UE with 3 different C/I for 4×4 MIMO and 4×2 MIMO. As discussed above, when operating with common pilots it will be necessary to minimize the power transmitted on the 3rd and 4th pilots in order to minimize impact to legacy users.

The performance with reduced pilot powers for 3rd and 4th antennas while keeping the pilot powers for 1st and 2nd antennas as −10 and −13 dB, respectively, was plotted. As indicated, as the pilot powers are reduced, the performance degrades due to bad channel estimation for CQI and data demodulation. The degradation is severe at high C/I compared to low C/I region. This is because at high C/I, there is a high probability of rank 3 and rank 4 transmissions and/or high data rates, which require a larger amount of pilot power energy. On the other hand, low data rates and/or rank selections, which occurs at low C/I can be demodulated with a lower amount of pilot energy (i.e. a higher traffic to pilot ratio).

Introduction of additional pilots when any 4 branch MIMO user is scheduled may cost some additional overhead and may not give benefit for all the scenarios. In reality, a high amount of pilot power is required when the UE is attempting to demodulate high data rates with high rank.

2. Common Pilots for CSI Estimation and Additional Pilots for Data Demodulation.

Figure 5:
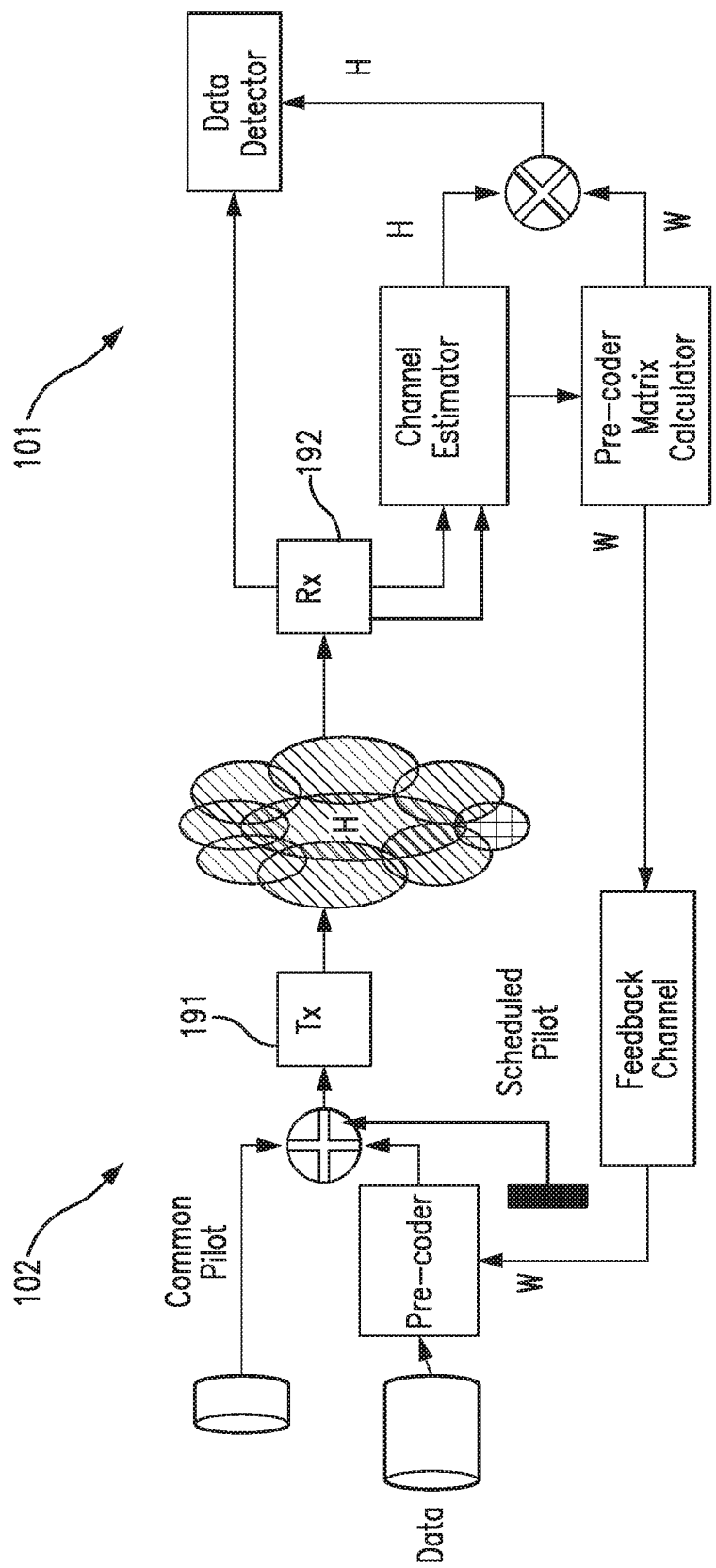
FIG. 5 is a diagram of another pilot design system.

The system diagram in this scheme is shown in FIG. 5. Similar to the common pilot scheme, known pilot symbols are used for channel sounding, the UE conveys the preferred precoding matrix, CQI through the feedback channel (e.g. HS-DPCCH). For downlink data transmission, The Node B uses this information and chooses the precoding matrix, CQI and the transport block size. For data transmission, data is multiplied by the precoding matrix selected by the Node B then transmitted. In addition to the data, additional pilots similar to common pilots without precoding are transmitted with high power from all or few subset of antennas (for example 3rd and 4th antennas). These additional pilots are called scheduled pilots. Using these additional pilots, the UE estimates the channel for data demodulation purposes.

Figure 6:
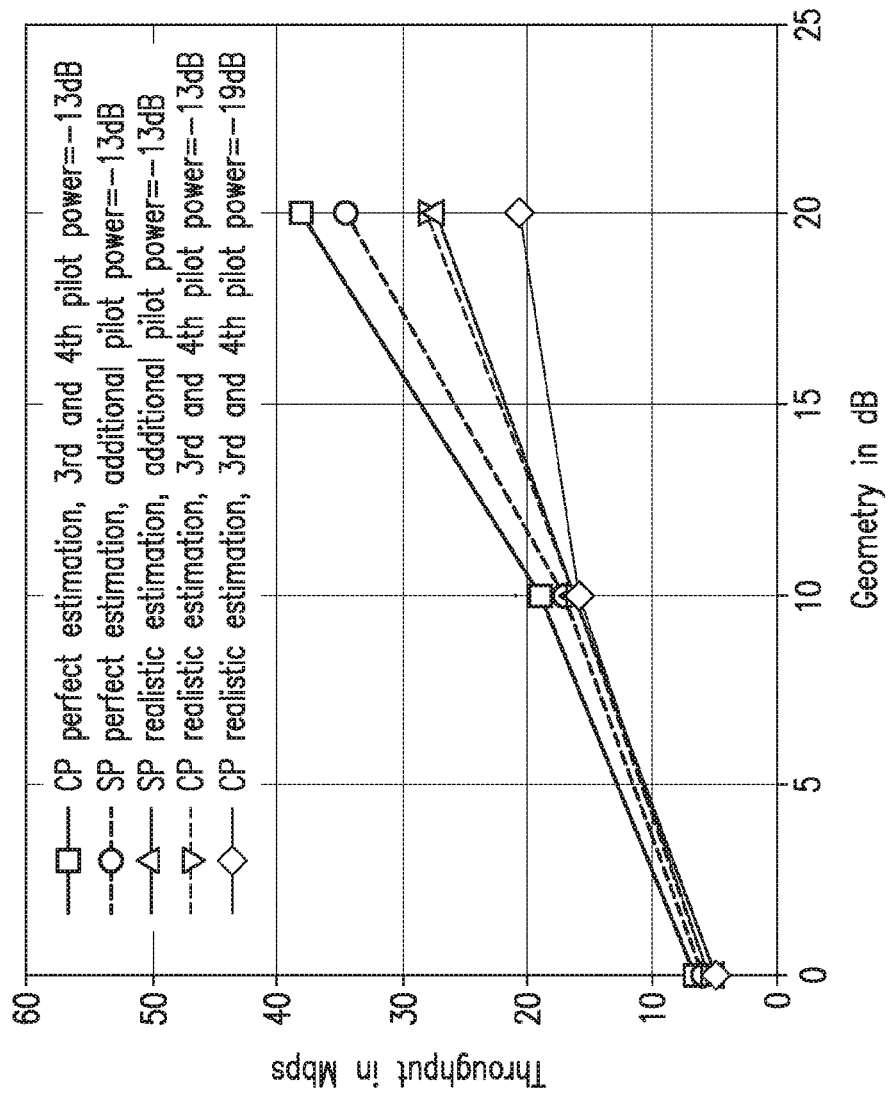
FIG. 6 shows link performance for a solution based on common pilots for CSI estimation and scheduled pilots for data demodulation.

FIG. 6 shows link performance for a solution based on common pilots for CSI estimation and scheduled pilots for data demodulation. Note that with ideal channel estimation, the performance of scheduled common pilot solution is always inferior to the common pilot solution with power of −13 dB on third and fourth antennas. This is due to the additional power allocated to these scheduled pilots. Additionally, the performance of schedule pilots with realistic estimation is close to that of common pilot solution with pilot power of −13 dB. Hence this solution is attractive in terms of link performance for four branch MIMO system.

The performance gains with scheduled pilots are almost negligible at low to medium geometries. Hence, scheduled pilots may not be needed for all geometries.

Figure 7:
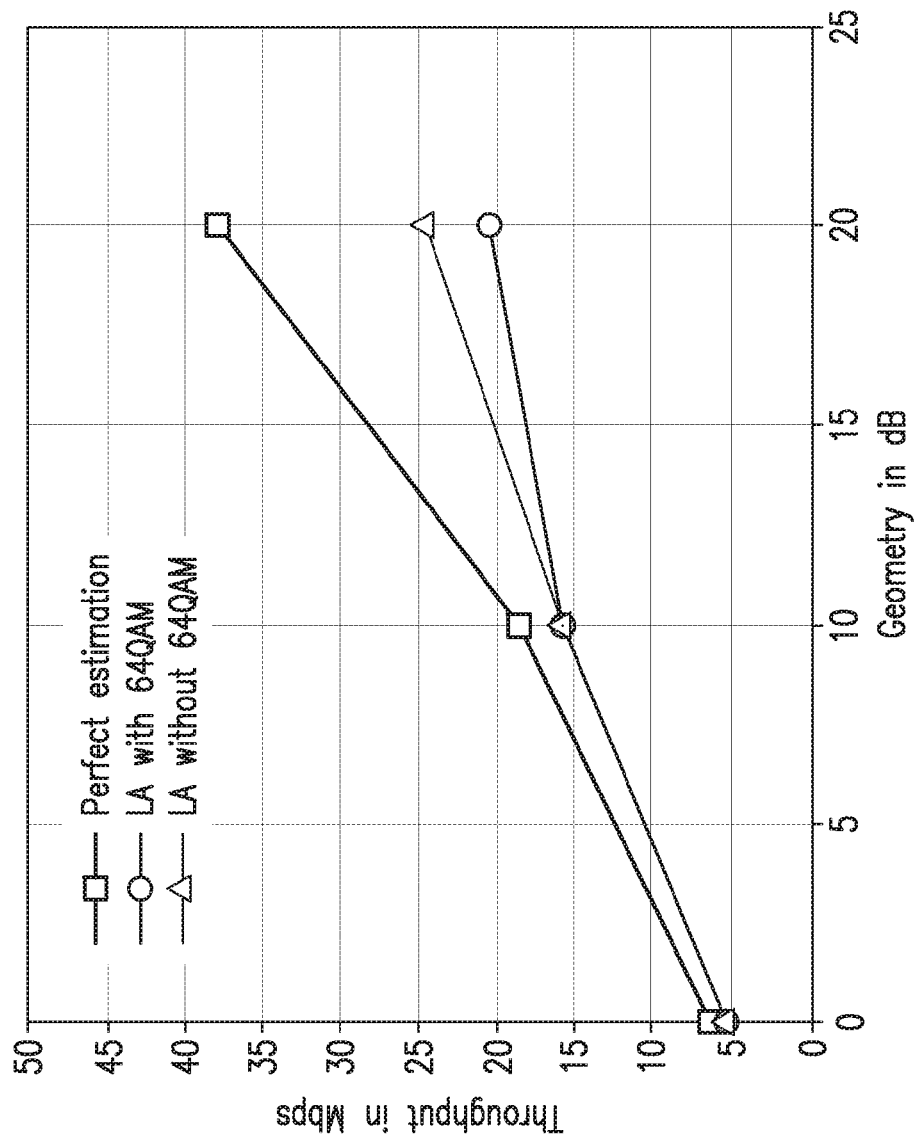
FIG. 7. shows performance with two different link adaptation algorithms

From FIG. 6 it can be observed that for low to medium geometries/data rates, common pilot solution is sufficient to give a reasonable performance. Additional pilots are more necessary at high SNR or for high data rate applications. To show the impact of reduced pilot power for high data rate application we plotted the 4×4 MIMO link performance with pilot powers [−10 −13 −19 −19] dB with two link adaptation (LA) algorithms. In the first link adaptation algorithm all modulations are considered i.e. QPSK, 16 QAM and 64 QAM, while in the second link adaptation algorithm; we consider only QPSK and 16 QAM. FIG. 7 shows the performance with these two link adaptation algorithms. The results with perfection estimation are also shown. It can be observed that at low and medium geometries the performance of the two link adaptation algorithms is same, while at high geometries the performance of the link adaptation algorithm without 64 QAM performs better. The performance degradation with conventional LA is around 33% and while with the modified LA is around 16% compared to the perfect estimation.

One solution is to use both common pilots plus scheduled pilots. The Node B can decide based on some criteria and decide which scheme to use. The UE can identify which scheme is used by looking at the High-Speed Shared Control Channel (HS-SCCH) control channel or by some HS-SCCH orders.

II. Conveying Information about Demodulation Pilots

According to the simulation results presented and the discussion, common pilots are transmitted for CSI estimation and additional pilots are chosen for data demodulation based on user information available at the Node B. Examples of user information include: CSI reports (e.g. CQI, PCI, RI etc), user signal quality in general, data rate, service type (e.g. whether requires higher data rate or not), geometry (e.g. ratio of received power from own cell to that from neighboring cells), etc. The signal quality can be expressed in terms of for example CQI, SINR, SNR, BLER, BER, ACK/NACK for DL signal reception, CPICH measurements (CPICH RSCP, CPICH Ec/No) etc. For example, when the users are nearer to the cell center (high geometries hence higher order modulations) additional pilots can be transmitted for data demodulation. Otherwise common pilots are sufficient for data demodulation.

Figure 8:
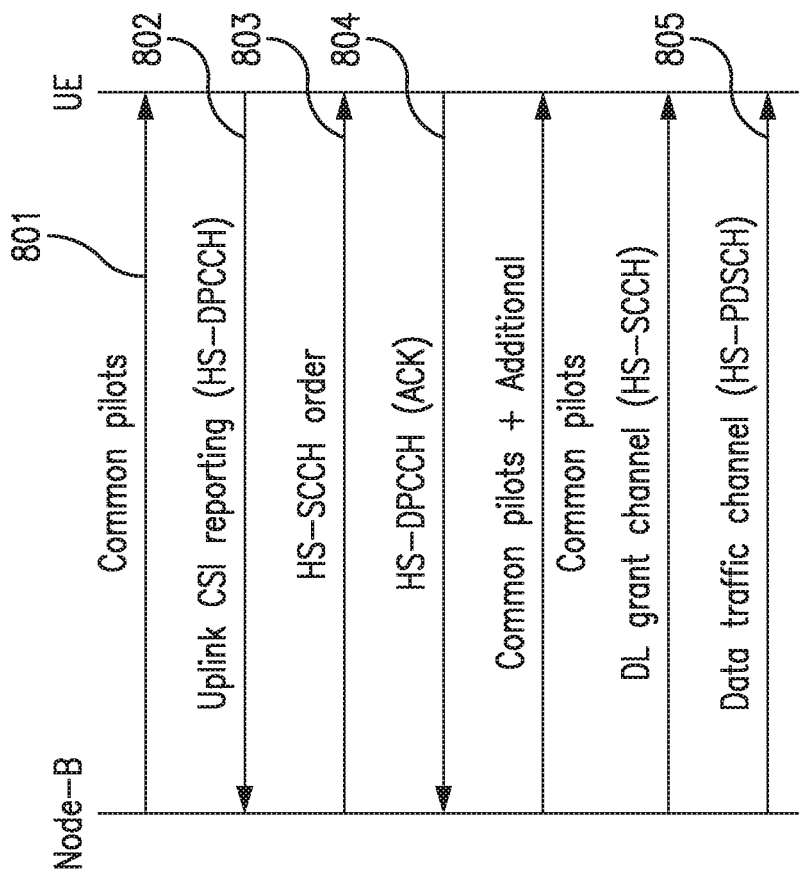
FIG. 8 shows a message sequence chart.

FIG. 8 shows a message sequence chart. In this case, common pilots 801 are transmitted from the Node B continuously for CSI estimation. The UE computes the channel state information: channel quality indicator (CQI), Precoding control index (PCI) and Rank information (RI) through these channels and report this information 802 in uplink feedback channel (HS-DPCCH). Once the Node B receives this information, the Node B scheduler decides whether common pilots are needed or scheduled pilots are needed for demodulation. This is done based on, for example, one or more of SNR, user location or modulation and code rate assigned etc. If the demodulation pilots are needed to be transmitted, the network (e.g, Node B) will convey this information through separate signaling using an HS-SCCH order 803 (e.g., special bit pattern for switching on demodulation pilots). If the UE is able to decode this message it will send an ACK 804 to this order through the feedback channel (HS-DPCCH). The data is transmitted there on HS-PDSCH 805. The UE can use the scheduled common pilots for demodulation until again informed by the Node B to use common pilots.

III. Conventional Method Computing Measurement Power Offset

As stated above, the Node B re-computes the actual CSI using the UE reported CSI, actual or recent measurement power offset based on current transmitted power levels, and signaled measurement power offset (i.e. value signaled to UE for CSI measurement). In this section we describe how the Node B can compute the measurement power offset ($\Gamma$). For Release 7 MIMO, the Node B computes the measurement power offset by the following equation:

$$\Gamma = P_{HSPDSCH} - P_{CPICH} \text{ in dB,}$$

where $P_{HSPDSCH}$ is the total transmit power at the Node B and is assumed to be evenly distributed among the HS-PDSCH codes. $P_{CPICH}$ denotes the combined transmit power of the set of CPICH(s) (primary C-PICH, S-CPICH on $2^{nd}$) used for MIMO operation of HS-DSCH.

For conveying this measurement power offset information to UE, Node B uses Radio Resource Control (RRC) signaling.

IV. Methods of Computing Measurement Power Offset, Signaling Over Iub and Signaling to UE

A. Embodiment 1

This embodiment may be implemented, at least primarily, on a radio node serving a UE. For example, it may be implemented in a relay node (see e.g., node 105 of FIG. 13) serving UE, but it can also be implemented in RNC 106, a donor node controlling a relay node (see e.g., node 102 of FIG. 13), or other network node.

As shown in FIG. 13, relay node (RN) 105 is connected to a network via a wireless interface 117 to a donor node 102 (also referred to as donor Node B (DNB)). The DNB 102 provides backhaul transport for the RN 105 and all the UEs 101 connected to the RN 105.

In this embodiment, the method comprises computing a measurement power offset (MPO) based on one or more criteria or condition. For example, the serving radio node (e.g. Node B 102 or RN 105) computes the measurement power offset: (1) using a first computing scheme, provided that only common plots are used and (2) using a second computing scheme, provided that common and demodulation pilots are used.

The method, according to this one embodiment, requires the network node (e.g. Node B/RN) to adapt the scheme for computing measurement power offset based on at least one criterion (e.g. signal quality, etc.).

The decision to use demodulation pilots may be based on one or more criteria as discussed above (e.g. downlink signal quality, type of service, data rate, etc). The DL signal quality can be determined from the UE reported measurements or estimation in the network.

The decision to use demodulation pilots or adapt the scheme for computing the measurement power offset can also be based on UE recommendation. For example, the two schemes for computing measurement power offset can be predefined (e.g. represented by identifiers 0 and 1). The UE, based on suitable criteria (e.g. DL signal quality, data rate, type of service etc), can recommend to the network whether the network should use first the computing scheme (0) or use the second computing scheme (1). The UE may send this recommendation over HS-DPCCH or over any channel directly to the node receiving CSI reports (e.g. Node B). The network (e.g. Node B) can either use its own scheme selection criteria (as explained above), use the UE recommendation, or some combination of its own criteria and the UE recommendation to decide which scheme to use for computing the measurement power offset.

The computed measurement power offset set can also be signaled by the node computing the measurement power offset to another node. The computing node or the other node may then signal the derived or computed measurement power offset to the UE. For example the computing node and the other nodes can be Node B 102 and RNC 106, respectively. In this case, the measurement power offset is signaled over the Iub interface 107 between the Node B and RNC. Furthermore, in this case, the measurement power offset received at the RNC is signaled to the UE using RRC. In another example, the computing node itself may signal the measurement power offset to the UE (e.g. the Node B may signal the measurement power offset to the UE using the media access control (MAC) layer). The method is further illustrated through the following example.

When the UE is not using additional demodulation pilots (i.e., when not signaled by Node B), the measurement power offset ($\Gamma$) computation may be computed by the following equation:

$$\Gamma = P_{HSPDSCH} - P_{CPICH} \text{ in dB,} \quad (1)$$

where $P_{HSPDSCH}$ is the total transmit power at the Node B side and is assumed to be evenly distributed among the HS-PDSCH codes. $P_{CPICH}$ denotes the combined transmit power of the set of CPICH(s) (primary C-PICH, S-CPICH on $2^{nd}$, $3^{rd}$ and $4^{th}$ transmit antennas) used for MIMO operation of HS-DSCH.

When demodulation pilots are used for data demodulation (e.g., the Node B decides to use demodulation pilots), then the measurement power offset ($\Gamma$) may be computed by the following equation.

$$\Gamma = P_{HSPDSCH} - P_{PICH} - P_{DPICH} \text{ in dB,} \quad (2)$$

where $P_{HSPDSCH}$ is the total transmit power at the Node B side and is assumed to be evenly distributed among the HS-PDSCH codes, $P_{CPICH}$ denotes the combined transmit power of the set of CPICH(s) (primary C-PICH, S-CPICH on $2^{nd}$) used for MIMO operation of HS-DSCH, and $P_{DPICH}$ denotes the combined transmit power of the set of D-CPICH(s) (demodulation pilots on $3^{rd}$ and $4^{th}$ antennas) used for MIMO operation of HS-DSCH. In the above equation, it is assumed that demodulations pilots are used on $3^{rd}$ and $4^{th}$ antennas.

Hence in this case, Node B has to signal two times the measurement offset to the RNC and to the UE via RNC. One is at the beginning and other once Node B gets an ACK for the HS-SCCH order. The UE has to use the most recently received measurement power offset from the network (e.g. from RNC) for estimating the CSI.

For re-computing the actual CSI, the Node B also uses the same method of measurement power offset which is used for signaling the measurement power offset to the UE for CSI estimation.

Figure 9:
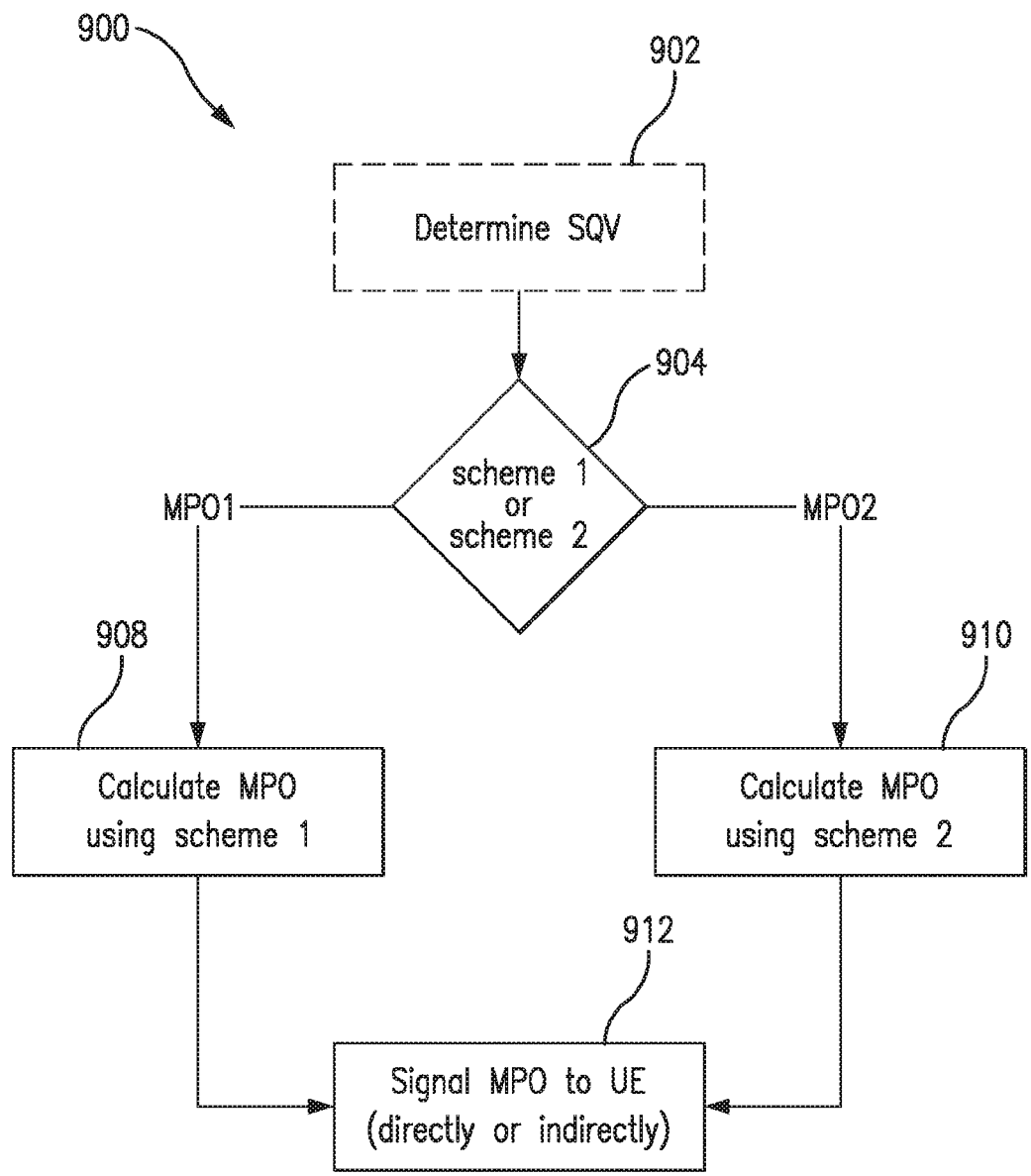
FIG. 9 is a flow chart illustrating a process, according to some embodiments, that is performed by a network node.

Accordingly, in some embodiment, the Node B or other network node, may perform the following process 900 (see FIG. 9). In step 902, the Node B determines a signal quality value (SQV) (optional step). In step 904, the Node B determines whether it should use a first scheme or a second scheme to calculate the measurement power offset (MPO). In some embodiments, step 904 consists of or comprises the Node B determining whether the SQV is above a threshold (T). In step 908, in response to determining that the first scheme (scheme-1) should be selected (e.g., in response to determining that the SQV is above T), the Node B uses scheme-1 to calculate the MPO. In step 910, in response to determining that the second scheme (scheme-2) should be selected (e.g., in response to determining that the SQV is not above T), the Node B uses scheme-2 to calculate the MPO. In step 912, the Node B sends to the UE (directly or indirectly) a message containing the calculated MPO.

B. Embodiment 2

This embodiment involves: 1) a radio node (e.g. a Node B, a relay node) serving a UE; 2) the UE, which receives measurement power offsets; and 3) another node (e.g. RNC, donor node controlling relay node), which communicates with the radio serving node and UE. In this embodiment, the network signals two measurement power offsets to the UE for CSI estimation. The UE selects, based on one or more criteria, one of the measurement power offsets and then uses the selected measurement power offset (e.g., for CSI estimation). The one or more criteria can be pre-defined or signaled to the UE, or combination thereof. For example, the criteria can be based on signal quality (e.g. BLER, SINR, SNR, etc), service type (e.g. low data rate, high data rate, etc). For example, a criteria can be: if signal quality is above a threshold, then first power offset is used by the UE for CSI estimation, otherwise second power offset is used by the UE for CSI estimation. The threshold in terms of signal quality can also be pre-defined or signalled to the UE.

Accordingly, the UE may perform the process 1000 (see FIG. 10) and a network node 102, 105, 106 my perform process 1400 (see FIG. 13).

Referring now to process 1000 (FIG. 10), in step 1001, the UE receives a first measurement power offset (MPO1) and a second measurement power offset (MPO2). In step 1002 (optional), the UE determines one or more of: a signal quality value (SQV) (i.e., a value representative of signal quality), a service type, and a data rate. In step 1003 (optional), the UE receives an HS-SCCH order. In step 1004, the UE determines whether it should select MPO1 or MPO2. In some embodiments, in step 1004, the UE determines whether it should select MPO1 or MPO2 based on the determined SQV, service type, and/or data rate. For example, in some embodiments step 1004 consists of or comprises the UE determining whether the SQV is above a threshold value (T). In some embodiments, step 1004 consists or comprises the UE selecting determines whether it should select MPO1 or MPO2 based on the received HS-SCCH order. In step 1008, in response to determining that MPO1 should be selected (e.g., in response to determining that the SQV is above T), the UE selects MPO1 and uses MPO1 for CSI estimation, but not MPO2 (e.g., uses MPO1 to determine one or more of CQI, PCI, RI). In step 1010, in response to determining that MPO2 should be selected (e.g., in response to determining that the SQV is not above T), the UE selects MPO2 and uses MPO2 for CSI estimation, but not MPO1 (e.g., uses MPO2 to determine one or more of CQI, PCI, RI). In step 1012, the UE sends to the network a CSI report (e.g., a message identifying CQI, PCI). In step 1014 (optional), the UE may also send to the network a message indicating which power offset was selected.

Figure 10:
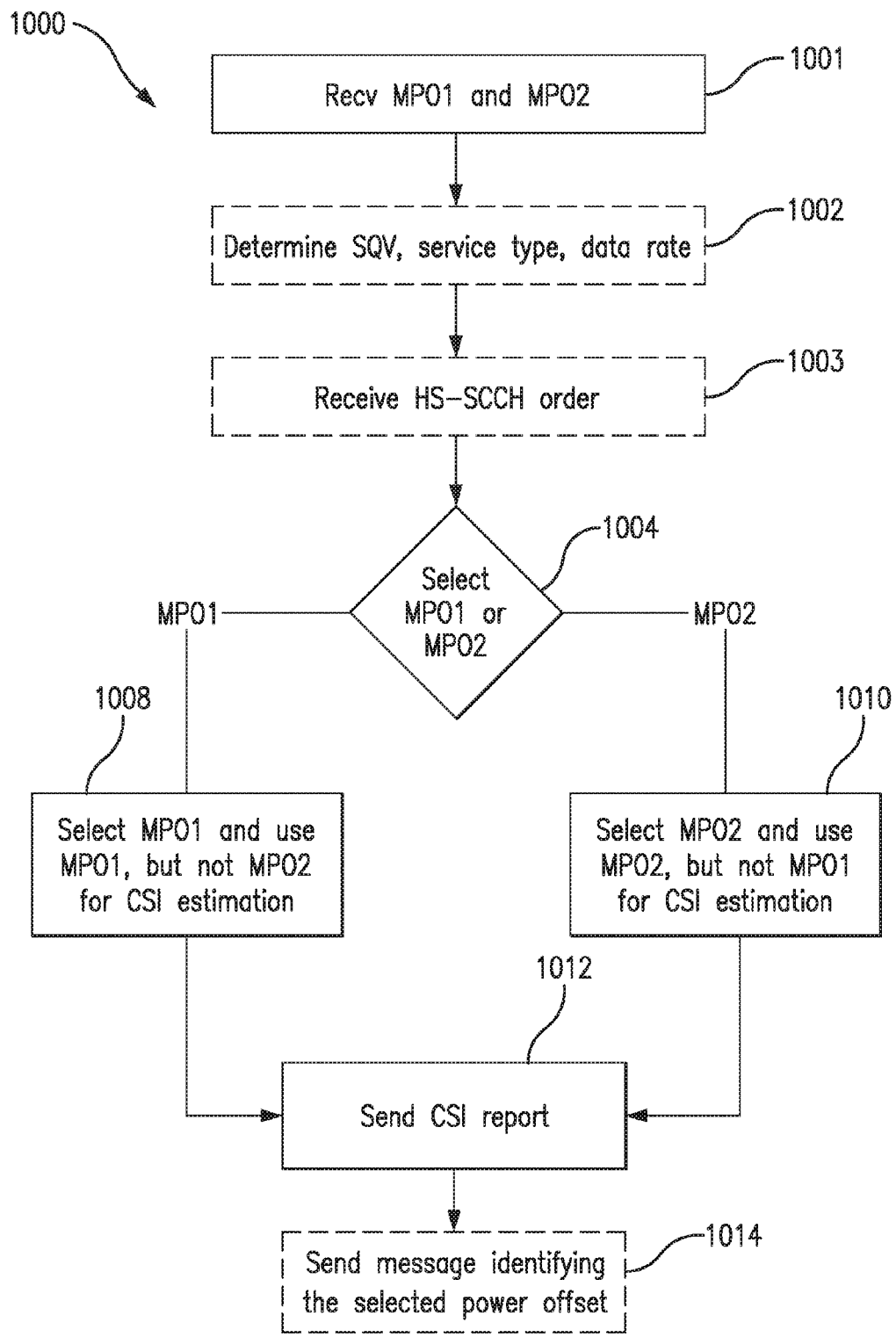
FIG. 10 is a flow chart illustrating a process, according to some embodiments, that is performed by a UE.

As illustrated in FIG. 10, according to some aspects of this embodiment, the UE may also report to the network the selected measurement power offset (i.e. first or second) used for estimating the reported CSI. For example, the expression of the two offsets can be pre-defined and can be represented by identifiers 0 and 1 respectively (i.e., 1 bit). As an example, the UE may indicate that it has used first power offset for the reported CSI if the said first power offset is used. This indication requires at least one bit of signaling in addition to CSI reports. This will enable the network (e.g. Node B) to use the same power offset to re-compute the actual CSI. The network node (e.g. RNC) may also configure the UE whether to indicate which power offset it (UE) uses for CSI estimation.

In some aspects of this embodiment, signaling of the two measurement power offsets between network nodes may be required, e.g. between Node B and RNC, between relay and donor node (aka controlling node). For example Node B signals the two offsets to the RNC over Iub interface. The RNC then signals the received values to the UE via RRC. The RNC may also signal them to another RNC which may signal it to the UE. This is described below.

Figure 14A:
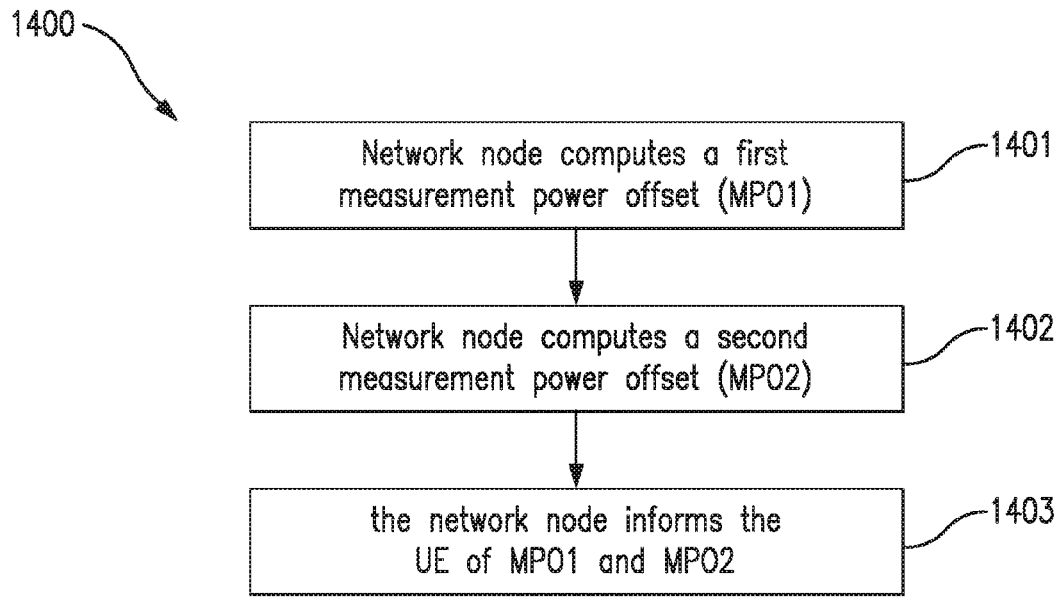
FIG. 14A is a flow chart illustrating a process, according to some embodiments, that is performed by a network node (e.g., a base station).

Referring now to process 1400 (FIG. 14), in step 1401, a network node (e.g., the Node B) computes a first measurement power offset (MPO1—a.k.a., "Γ" or "Γ1").

In step 1402, the network node computes a second measurement power offset (MPO2—a.k.a., "Γ1" or "Γ2").

In step 1403, the network node informs the UE of MPO1 and MPO2, either directly or indirectly (e.g., indirectly via RNC). In both cases the measurement power offsets may be signaled using MAC and RRC messages, respectively. In some embodiments, the network node informs the UE of MPO1 at a different time than the time at which the network node informs the UE of MPO2. The two measurement power offsets computations are according to the following equations:

$$MPO1 = \Gamma1 = P_{HSPDSCH} - P_{CPICH} \text{ in dB, and}$$

$$MPO2 = \Gamma2 = P_{HSPDSCH} - P_{CPICH} - P_{DPICH} \text{ in dB}$$

where $P_{HSPDSCH}$ is the total transmit power at the Node B side and is assumed to be evenly distributed among the HS-PDSCH codes, $P_{CPICH}$ denotes the combined transmit power of the set of CPICH(s) (primary C-PICH, S-CPICH on $2^{nd}$, $3^{rd}$ and $4^{th}$ transmit antennas) used for MIMO operation of HS-DSCH for computing Γ1 and for computing Γ2, it consists of only P-CPICH and S-CPICH on $2^{nd}$ antenna.

As one example, the network node (e.g., Node B) sends the two measurement power offsets (MPO1 and MPO2) indirectly to the UE via RNC.

Figure 14B:
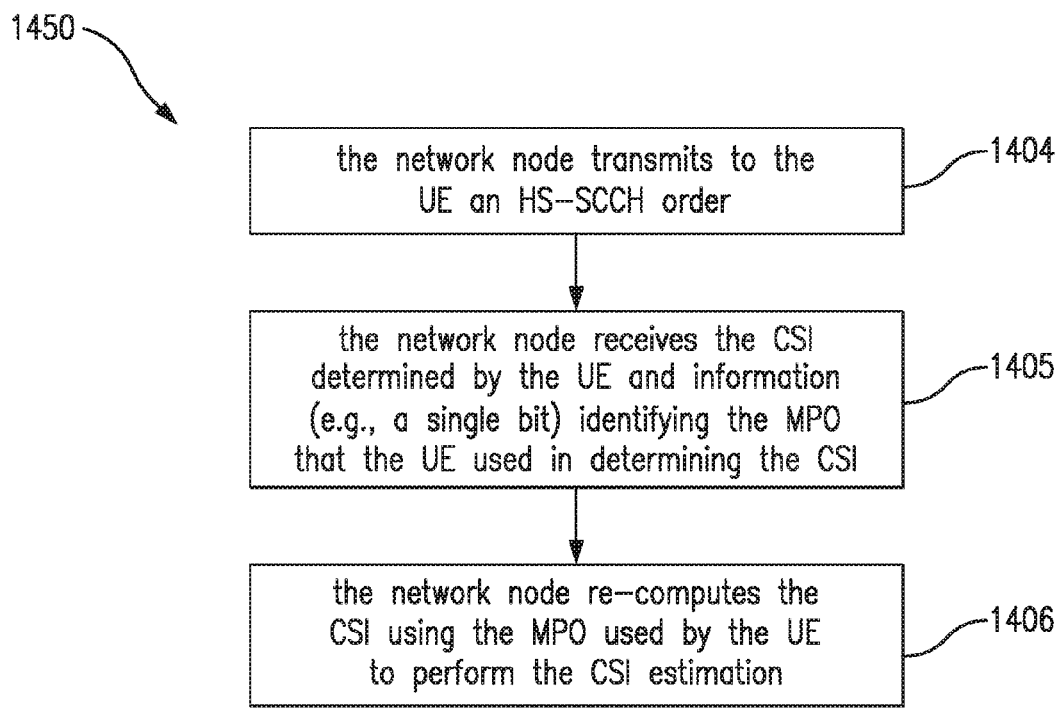
FIG. 14B is a flow chart illustrating a process, according to some embodiments, that is performed by a network node (e.g., a base station).

Referring now to FIG. 14B, which illustrates a process 1450, in some embodiments, the network node determines, based on one or more criteria (e.g., downlink signal quality, service type, data rate), which of the two MPOs (MPO1 or MPO2) the UE should use in computing CSI and transmits to the UE an HS-SCCH order that, as discussed above, informs the UE about which measurement power offset the network node has determined the UE should use in computing the CSI (step 1404). As also discussed above (see FIG. 10), which MPO the UE will select to use (i.e., MPO1 or MPO2) may depend on some condition or criteria (e.g. based on signal quality).

The UE computes the CSI based on the selected measurement power offset and reports the computed CSI to the network node. The UE may also indicate to the network as to which power offset was used for estimating the reported CSI. Accordingly, in step 1405, the network node receives the CSI determined by the UE and information (e.g., a single bit) identifying the MPO that the UE used in determining the CSI. In step 1406, the network node re-computes the CSI using the MPO used by the UE to perform the CSI estimation.

Figure 15:
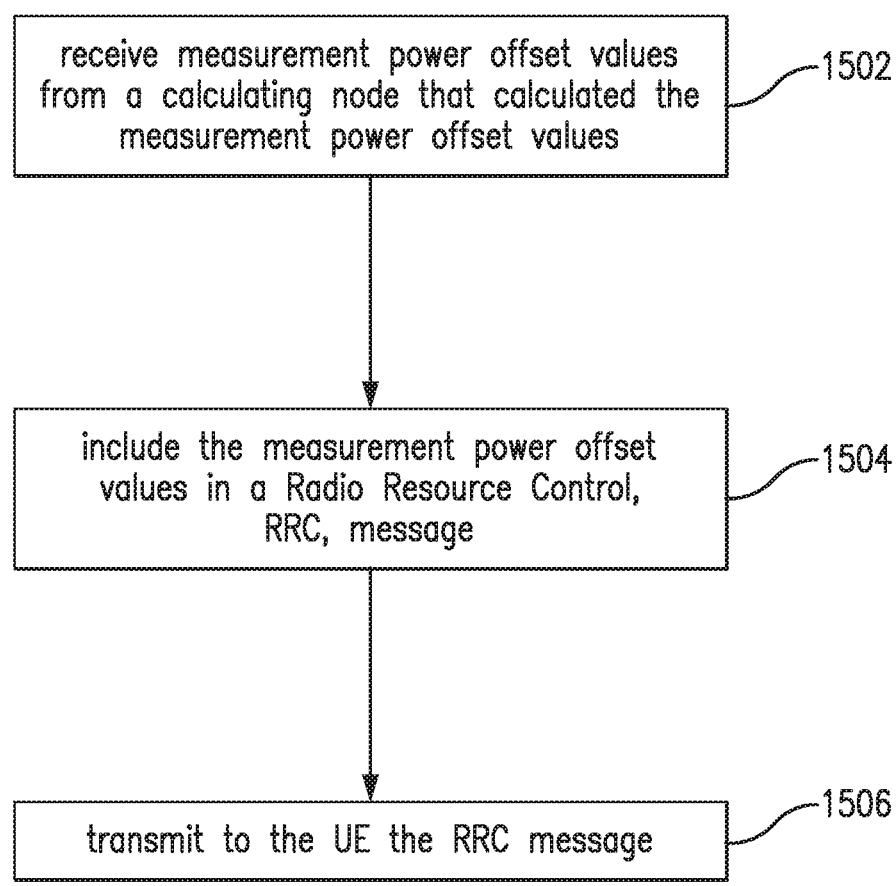
FIG. 15 is a flow chart illustrating a process, according to some embodiments, that is performed by a network node (e.g., an RNC).

Referring now to FIG. 15, FIG. 15 illustrates a process, according to one embodiments, for informing the UE of the two MPOs (MPO1 and MPO2). The process may begin in step 1502, where RNC 106 receives, via an Iub interface 107, from Node B 102 (i.e., the "calculating node") the measurement power offsets (i.e., MPO1 and MPO2) calculated by Node B 102 as described above with reference to process 1400. In step 1504, RNC 106 includes the received measurement power offsets in a message (e.g., an RRC message as described in FIG. 15). In step 1506, RNC 106 transmits the message that includes the two measurement power offsets (i.e., the message is transmitted so that the UE 101 will receive the two MPOs). For example, in one embodiment, the message is transmitted to the UE via a base station. In another embodiment, the message is sent to another RNC (not shown) that then transmits the two MPOs to UE 101.

Figure 11:
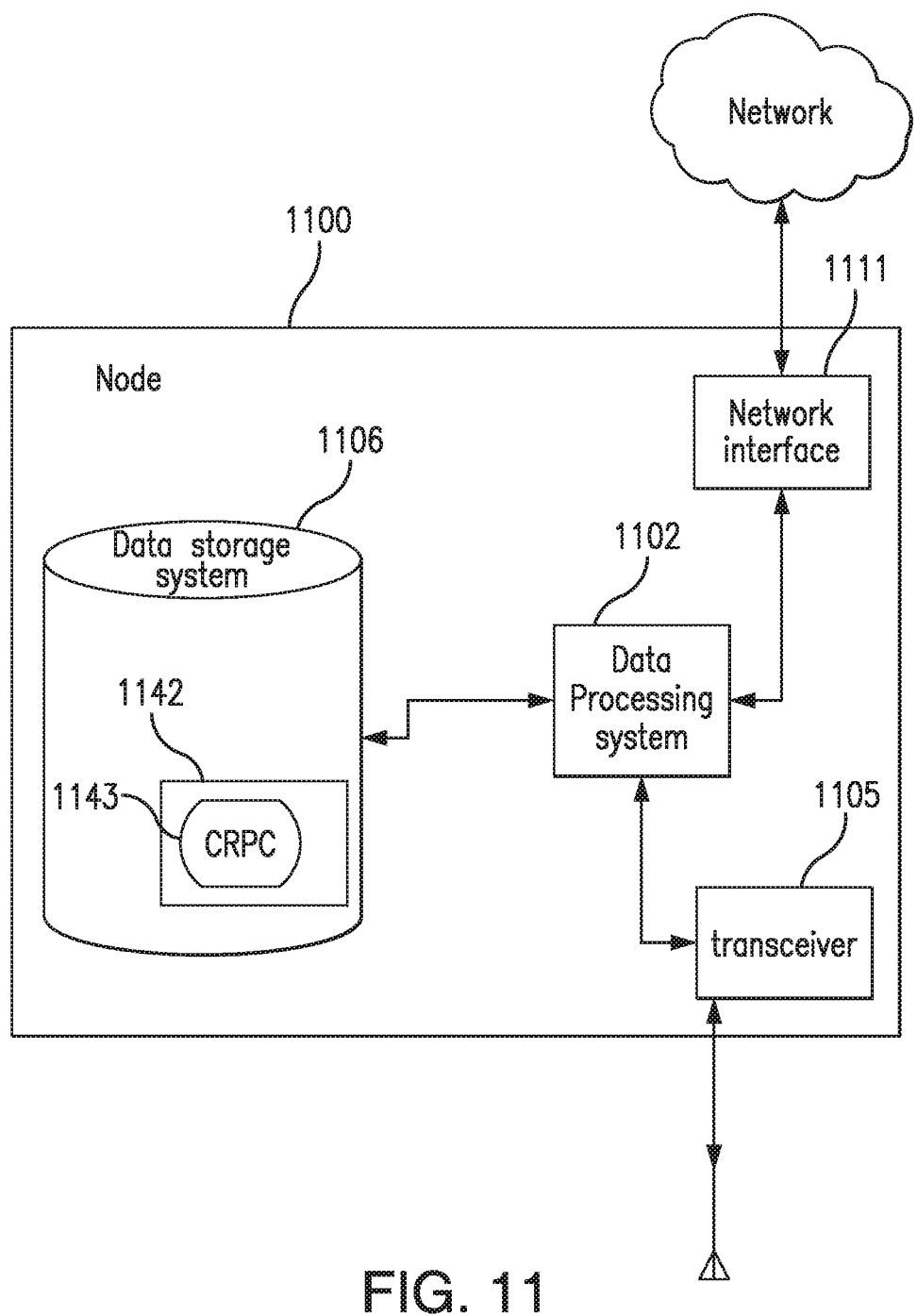
FIG. 11 is a block diagram of a network node according to some embodiments.

Referring now to FIG. 11, FIG. 11 illustrates a block diagram of a network node 1100 (e.g., a base station 102, a relay 105, a RNC 106) according to some embodiments. As shown in FIG. 11, the network node 1100 includes: a data processing system 1102, which may include one or more data processing devices each having one or more microprocessors and/or one or more circuits, such as an application specific integrated circuit (ASIC), Field-programmable gate arrays (FPGAs), etc and a data storage system 1106, which may include one or more computer-readable mediums, such as non-volatile storage devices and/or volatile storage devices (e.g., random access memory (RAM)). Network node 1100 may also include a transceiver 1105 for wirelessly transmitting and receiving data and a network interface 1111 for connecting network node 1100 to a network (e.g., an Internet Protocol (IP) network).

In embodiments where data processing system 1102 includes a microprocessor, a computer program product is provided, which computer program product includes: computer readable program code 1143 (i.e., instructions), which implements a computer program, stored on a computer readable medium 1142, such as, but not limited, to magnetic media (e.g., a hard disk), optical media (e.g., a DVD), memory devices (e.g., random access memory), etc. In some embodiments, computer readable program code 1143 is configured such that, when executed by data processing system 1102, code 1143 causes the network node 1100 to perform the steps described herein (e.g., one or more steps shown in the flowcharts and/or described in connection with FIGS. 9, 14A, and 14B). In other embodiments, network node 1100 may be configured to perform steps described herein without the need for code 1143. For example, data processing system 1102 may consist merely of specialized hardware, such as one or more application-specific integrated circuits (ASICs). Hence, the features of the present invention described above may be implemented in hardware and/or software. For example, in some embodiments, the functional components of network node 1100 described above may be implemented by data processing system 1102 executing computer instructions 1143, by data processing system 1102 operating independent of any computer instructions 1143, or by any suitable combination of hardware and/or software.

Figure 12:
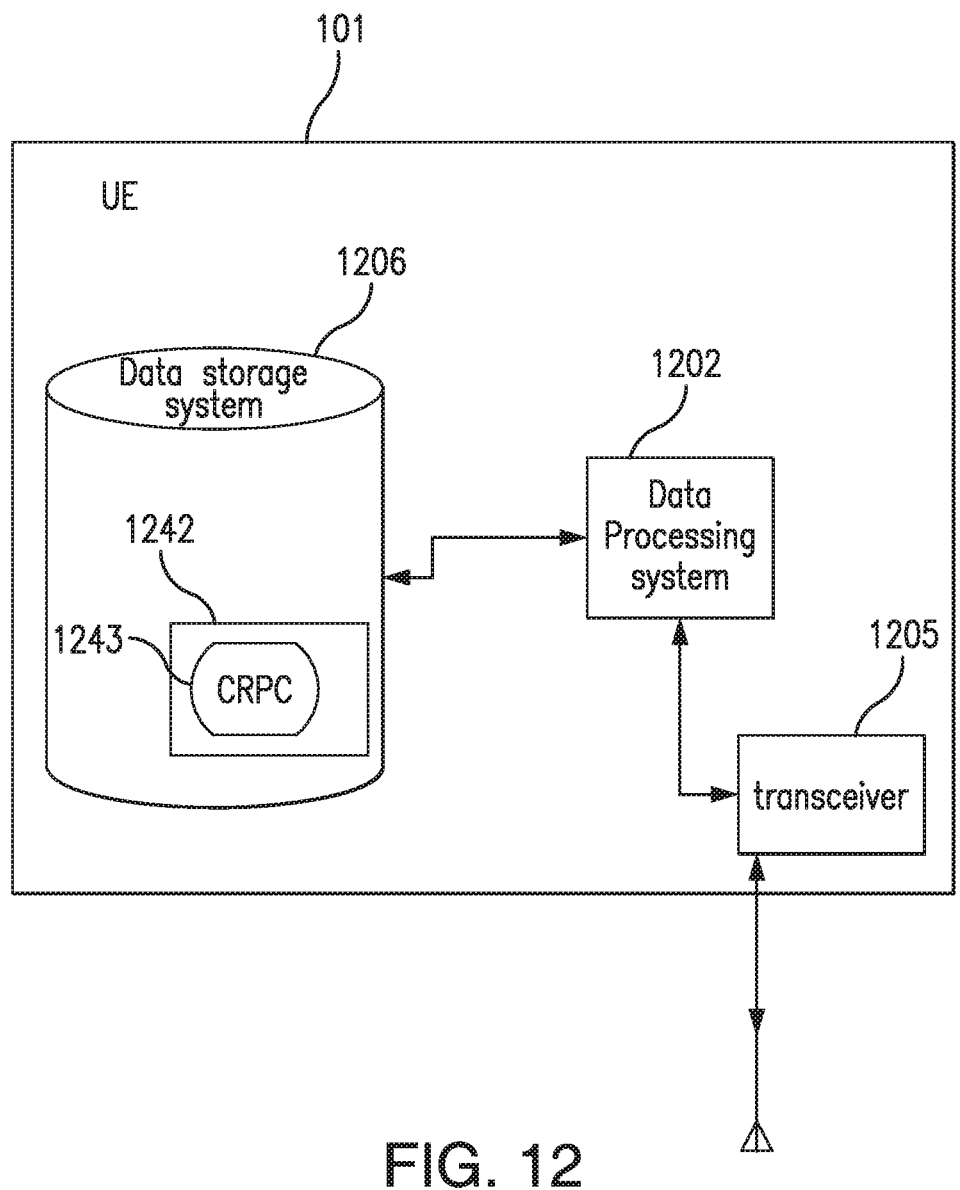
FIG. 12 is a block diagram of a UE according to some embodiments.

Referring now to FIG. 12, FIG. 12 illustrates a block diagram of a UE 101 according to some embodiments. As shown in FIG. 12, the UE 101 may include: a data processing system 1202, which may include one or more data processing devices each having one or more microprocessors and/or one or more circuits, such as an application specific integrated circuit (ASIC), Field-programmable gate arrays (FPGAs), etc; a data storage system 1206, which may include one or more computer-readable mediums, such as non-volatile storage devices and/or volatile storage devices (e.g., random access memory (RAM)); and a transceiver 1205 for transmitting data to (and receiving data from) base stations (e.g., base station 102 or 105).

In embodiments where data processing system 1202 includes a microprocessor, a computer program product is provided, which computer program product includes: computer readable program code 1243 (i.e., instructions), which implements a computer program, stored on a computer readable medium 1242, such as, but not limited, to magnetic media (e.g., a hard disk), optical media (e.g., a DVD), memory devices (e.g., random access memory), etc. In some embodiments, computer readable program code 1243 is configured such that, when executed by data processing system 1202, code 1243 causes the UE 101 to perform the steps described herein (e.g., one or more steps shown in the flowcharts and/or described in connection with FIG. 10). In other embodiments, UE 101 may be configured to perform steps described herein without the need for code 1243. For example, data processing system 1202 may consist merely of specialized hardware, such as one or more application-specific integrated circuits (ASICs). Hence, the features of the present invention described above may be implemented in hardware and/or software. For example, in some embodiments, the functional components of UE 101 described above may be implemented by data processing system 1202 executing computer instructions 1243, by data processing system 1202 operating independent of any computer instructions 1243, or by any suitable combination of hardware and/or software.

While the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A first network node for sending to a user equipment (UE) a first measurement offset, $\Gamma 1$, and a second measurement offset, $\Gamma 2$, for estimating channel state information (CSI), the network node being configured to:
   receive the first measurement offset for estimating CSI, $\Gamma 1$, and the second measurement offset for estimating CSI, $\Gamma 2$, from a calculating node that calculated $\Gamma 1$ and $\Gamma 2$;
   include $\Gamma 1$ and $\Gamma 2$ in a message; and
   transmit the message so that the UE will receive the message, thereby providing $\Gamma 1$ and $\Gamma 2$ to the UE, wherein
   the first network node is a first Radio Network Controller (RNC),
   the calculating node is a base station, and
   the message is a Radio Resource Control (RRC) message, wherein Γ1=P1−P2, wherein P1 is a first power value and P2 is a second power value, and
Γ2=Γ1−P3, wherein P3 is a third power value.

2. The first network node of claim 1, wherein the first RNC is configured to transmit the RRC message so that the UE will receive the RRC message by transmitting the RRC message to a second RNC.

3. The first network node of claim 1, wherein the first RNC is configured to transmit the message so that the UE will receive the message by transmitting the message to a base station.

4. The first network node of claim 1, wherein the first RNC is configured to receive Γ1 and Γ2 from the base station via an Iub interface.

5. A method performed by a first network node for sending to a user equipment (UE) a first measurement offset, Γ1, and a second measurement offset, Γ2, for estimating channel state information (CSI), the method comprising:
receiving, at the first network node, the first measurement offset for estimating CSI, Γ1, and the second measurement offset for estimating CSI, Γ2, from a calculating node that calculated Γ1 and Γ2;
the first network node including Γ1 and Γ2 in a message; and
transmitting, from the first network node, the message so that the UE will receive the message, thereby providing Γ1 and Γ2 to the UE, wherein
the first network node is a first Radio Network Controller (RNC),
the calculating node is a base station, and
the message is a Radio Resource Control (RRC) message, wherein
Γ1=P1−P2, wherein P1 is a first power value and P2 is a second power value, and
Γ2=Γ1−P3, wherein P3 is a third power value.

6. The method of claim 5, wherein transmitting the RRC message so that the UE will receive the RRC message comprises transmitting the RRC message to a second RNC.

7. The method of claim 5, transmitting the RRC message so that the UE will receive the RRC message comprises transmitting the RRC message to a base station.

8. The method of claim 5, wherein receiving Γ1 and Γ2 from the base station comprises receiving Γ1 and Γ2 via an Iub interface.

9. The method of claim 5, wherein receiving Γ1 and Γ2 from the base station comprises:
receiving a first message comprising Γ1; and
receiving a second message comprising Γ2, wherein the second message is separate and distinct from the first message.

10. The method of claim 9, wherein
the first message is received over an Iub interface, and
the second message is received over the Iub interface.

11. The method of claim 5, wherein
P1 identifies a total transmit power ($P_{HSPDSCH}$),
P2 identifies a combined transmit power of a set of common pilot channels ($P_{CPICH}$), and
P3 identifies a combined transmit power of a set of demodulation pilot channels ($P_{DPICH}$).

12. The method of claim 5, further comprising
receiving, from the UE, channel state information (CSI) estimated by UE using one of Γ1 and Γ2.

13. The first network node of claim 1, wherein
P1 identifies a total transmit power ($P_{HSPDSCH}$),
P2 identifies a combined transmit power of a set of common pilot channels ($P_{CPICH}$), and
P3 identifies a combined transmit power of a set of demodulation pilot channels ($P_{DPICH}$).

14. The first network node of claim 1, further comprising:
a receiver for receiving, from the UE, channel state information (CSI) estimated by UE using one of Γ1 and Γ2.

* * * * *

UNITED STATES PATENT AND TRADEMARK OFFICE
CERTIFICATE OF CORRECTION

PATENT NO. : 9,955,374 B2
APPLICATION NO. : 15/040011
DATED : April 24, 2018
INVENTOR(S) : Nammi et al.

Page 1 of 1

It is certified that error appears in the above-identified patent and that said Letters Patent is hereby corrected as shown below:

On the Title Page

In Item (57), under "ABSTRACT", in Column 2, Line 3, delete "station" and insert -- state --, therefor.

On Page 2, in Item (56), under "OTHER PUBLICATIONS", in Column 2, Line 21, delete "Piolet" and insert -- Pilot --, therefor.

In the Specification

In Column 1, Line 9, delete "2013" and insert -- 2013, now Pat. No. 9,264,201 --, therefor.

In Column 1, Line 38, delete "(4×2) (4×1))" and insert -- (4×2), (4×1)) --, therefor.

In Column 3, Line 52, delete "station" and insert -- state --, therefor.

In Column 4, Line 10, delete "FIG. 7." and insert -- FIG. 7 --, therefor.

In Column 8, Line 47, delete "$\Gamma=P_{HSPDSCH}-P_{PICH}-P_{DPICH}$ in dB," and insert -- $\Gamma=P_{HSPDSCH}-P_{CPICH}-P_{DPICH}$ in dB, --, therefor.

In Column 9, Line 40, delete "my" and insert -- may --, therefor.

In Column 10, Line 41, delete "MP01" and insert -- MPO1 --, therefor.

Signed and Sealed this
Thirty-first Day of July, 2018

Andrei Iancu
*Director of the United States Patent and Trademark Office*